Oct. 20, 1970  G. F. N. WEST  3,534,542
ROPES
Filed Sept. 24, 1968
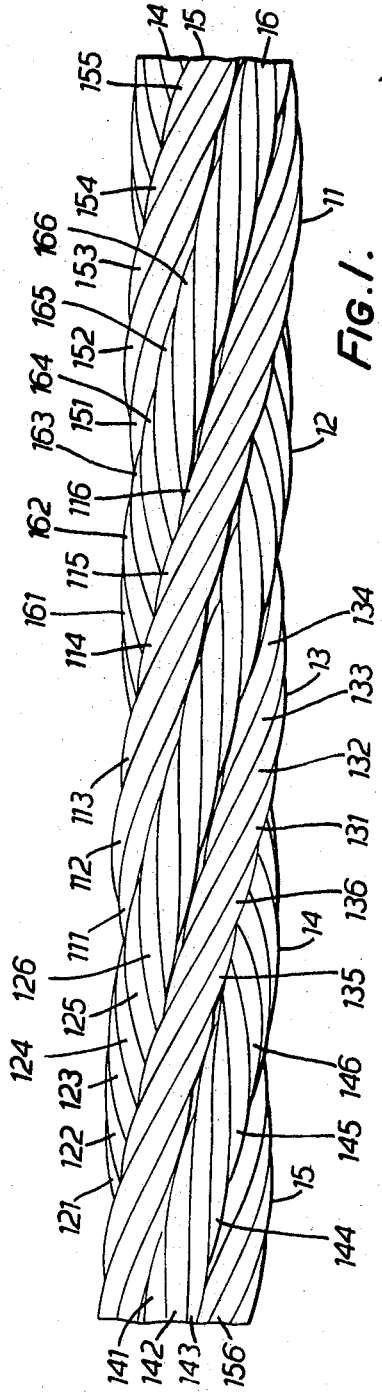
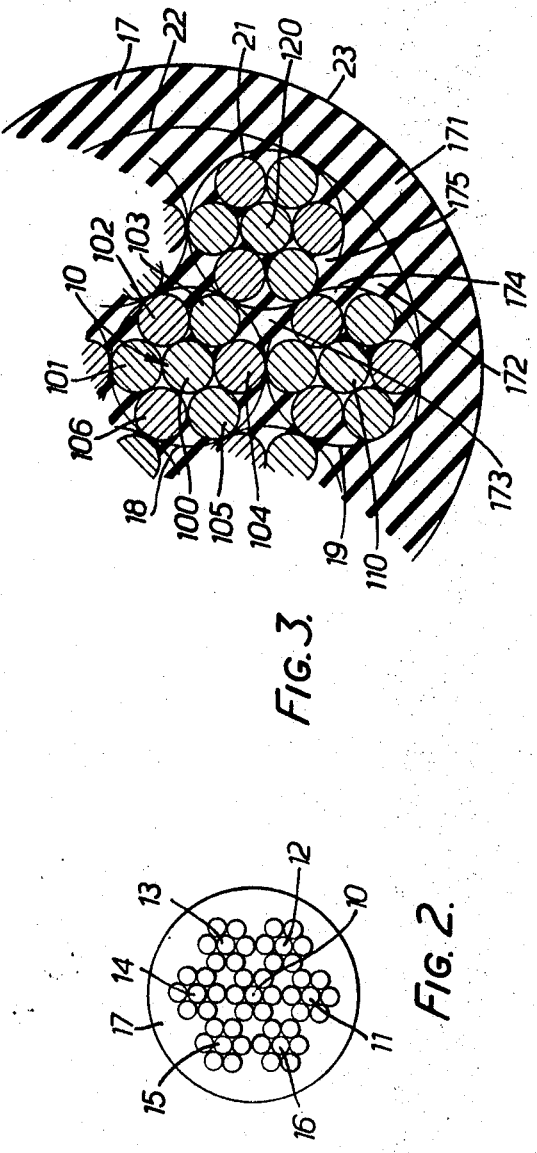
Guy F. N. West
INVENTOR
BY
Lawrence E. Laubscher
ATTORNEY

United States Patent Office 3,534,542
Patented Oct. 20, 1970

3,534,542
ROPES
Guy Frederik Nanyah West, Norse Land, Church Lane, Lower Layham, near Hadleigh, England
Filed Sept. 24, 1968, Ser. No. 762,034
Claims priority, application Great Britain, Oct. 12, 1967, 46,621/67
Int. Cl. D07b *1/06, 1/16*
U.S. Cl. 57—145      2 Claims

ABSTRACT OF THE DISCLOSURE

A multi-strand wire rope covered and impregnated with a synthetic plastic or rubber material, characterized in that the wires of each strand have the same respective lay along the strand, and that the wires of alternate strands extend along the respective strands with opposite lays.

---

The present invention relates to ropes, and more particularly to multi-strand wire ropes which are covered and impregnated with plastics or rubber material.

Ropes are made up of one or more strands, each strand being formed by a plurality of wires usually arranged in a right-hand or left-hand lay. In the case of multi-strand ropes, it is common for one of the strands to form a centre strand, with the other strands arranged in a given lay around the centre strand, and for each of the strands to be formed by a centre wire and outer wires arranged in opposite lay around the centre wire. For example, one known form of rope is the "7 x 7" rope, the first figure representing the number of strands in the rope and the second figure the number of wires in each strand. Thus, this known rope has seven strands with seven wires in each strand. The strands are arranged with one centre strand and six outer strands in right-hand lay around the centre strand, each strand being formed by a centre wire and six outer wires arranged in left-hand lay around the centre wire. Such a "7 x 7" rope is also known which is covered and impregnated with plastics material.

One problem encountered has been the tendency of the outer layer of the plastics material to strip away from the remainder of the rope. One solution to this problem has been to make one outer wire in each strand of greater thickness than the other wires, thereby spacing the strands apart to increase the thickness of the plastics material in between the strands.

According to the invention, there is provided a multi-strand wire rope covered and impregnated with plastics or rubber material, in which alternate strands are formed by wires arranged in opposite lays.

It is believed that such an arrangement provides an alternative solution to hold the covering layer of plastics or rubber material to the rope.

The invention will be described by way of example with reference to the accompanying drawings, wherein:

FIG. 1 is a side view of a short length of 7 x 7 rope in accordance with the invention, but without the plastics or rubber material;

FIG. 2 is a cross-section of the rope perpendicular to the rope axis, with the plastics or rubber material, and FIG. 3 is a partial cross-section, similar to FIG. 2, of the centre strand and two outer strands.

Referring to FIGS. 1 and 2, the rope is formed of a centre strand 10 and six outer strands 11 to 16, arranged in right-hand lay around the centre strand 10.

Each of the seven strands 10 to 16 is formed by seven wires. The centre strand 10 is formed by a centre wire 100 and six outer wires 101 to 106 arranged in left-hand lay around the centre wire 100. Similarly, alternate outer strands 11, 13, 15 are formed each respectively by a centre wire 110, 130, 150 and six outer wires 111 to 116, 131 to 136 and 151 to 156 arranged in left-hand lay around the respective centre wires 110, 130, 150.

The other three alternate outer strands 12, 14 and 16, on the other hand, are formed each respectively by a centre wire 120, 140, 160 and six outer wires 121 to 126, 141 to 146 and 161 to 166 arranged in right-hand lay around the respective centre wires 120, 140, 160.

The rope is covered and impregnated with plastics or rubber material 17, which is integrally moulded around and through the rope.

The formation of the plastics material 17 may be appreciated from FIG. 3, which shows the centre strand 10 and an outer adjacent pair of strands 11 and 12.

The plastics material 17 may be regarded conveniently as being formed by several distinct portions, although all these portions are in fact integrally moulded together. In FIG. 3, these have been defined by circular "envelope" lines 18, 19, 21 defining the outer peripheries of the individual strands 10, 11 and 12 respectively, a circular envelope line 22 defining the outer peripheries of the strands 10 to 16 considered together and an outer circular envelope line 23 defining the outer periphery of the plastics or rubber material.

Firstly, there is the outer layer of material 171 between envelope lines 22 and 23.

Then there is a strip 172 of three curved sided cross-section between lines 22, 19 and 21. This strip has a right-hand lay along the rope, between strands 11 and 12. Five other similar strips lie between the other pairs of adjacent outer strands of the rope and line 22.

Thirdly, there is another strip 173 of three curved sided cross-section between lines 18, 19 and 21, also having a right-hand lay along the rope between strands 11 and 12. Five other similar strips lie between the other pairs of adjacent outer strands of the rope, adjacent the centre strand 10.

Finally, in each of the strands 10 to 16 there are ten strips of three curved sided cross-section, having right-hand or left-hand lay about the respective centre wires of the strands, according to the lays of the outer wires of each strand.

The above description assumes the idealised case of all wires being positioned as shown. Clearly, there will usually be minor irregularities with deformation of the wires and/or lack of contact between adjacent wires.

The invention is particularly concerned with the arrangement of the five outer strips of plastics material in each strand. Referring to FIG. 3, adjacent pairs of outer strands such as 11 and 12 are preferably arranged "in step," so that corresponding pairs of strips such as 174 and 175 form a single "web" at the point of contact of lines 19 and 21. Since the wires in strands 11 and 12 are of left-hand and right-hand lays respectively, the "webs" between these strands extend progressively radially inwardly as viewed along the rope. This also applies to the webs between strands 13 and 14 and between strands 15 and 16 respectively. On the other hand, the webs between strands 12 and 13, between strands 14 and 15 and between strands 16 and 11 extend progressively radially outwardly as viewed along the rope.

The important point is that the minimum cross-section of each web in the example described above is greater than the minimum cross-sections of webs in similarly dimensioned 7 x 7 covered and impregnated ropes in which the outer wires of all the strands are of the same lay.

The invention may be applied to ropes having different numbers of strands and different numbers of wires per strand, than those of the 7 x 7 rope described above.

I claim:
1. In a rope including a plurality of strands extending side-by-side with the same lay along the length of the rope, each strand being formed by a plurality of wires extending along the strand, the wires of each respective strand having the same respective lay along the strand, and resilient material impregnating and covering the strands, the improvement wherein the wires of alternate strands extend along the respective strands with opposite lays.

2. A rope according to claim 1, wherein said strands are arranged around a further strand extending along the axis of the rope, said further strand comprising a plurality of wires extending helically along said further strand.

References Cited

UNITED STATES PATENTS

| 2,900,785 | 8/1959 | Fenner | 57—149 XR |
|---|---|---|---|
| 3,131,530 | 5/1964 | Dietz | 57—149 |

JOHN PETRAKES, Primary Examiner

U.S. Cl. X.R.

57—149